United States Patent

Barber et al.

[11] Patent Number: 5,924,112
[45] Date of Patent: Jul. 13, 1999

[54] BRIDGE DEVICE

[75] Inventors: Simon Davie Barber, Berks; Crispin Nicholas Dent-Young; Christopher Guy Sabey, both of Beaconsfield; Jonathan Curnyn; David Andrew James Pearce, both of Bucks; Trevor Warwick, Reading, all of United Kingdom

[73] Assignee: Madge Networks Limited, Buckinghamshire, United Kingdom

[21] Appl. No.: 08/707,941

[22] Filed: Sep. 10, 1996

Related U.S. Application Data

[60] Provisional application No. 60/007,541, Nov. 24, 1995.

[30] Foreign Application Priority Data

Sep. 11, 1995 [GB] United Kingdom .................. 9518522

[51] Int. Cl.$^6$ ...................................................... G06F 12/00
[52] U.S. Cl. ........................... 711/100; 711/170; 711/171; 711/217; 395/872
[58] Field of Search ............................. 711/100, 170, 711/171, 217, 220, 218; 707/205; 395/850, 800, 670, 872, 876, 200.66, 200.75, 200.43; 360/48

[56] References Cited

U.S. PATENT DOCUMENTS

| | | | |
|---|---|---|---|
| 4,499,539 | 2/1985 | Vosacek | 707/205 |
| 4,748,617 | 5/1988 | Drewlo | 359/121 |
| 5,163,136 | 11/1992 | Richmond | 395/850 |
| 5,247,694 | 9/1993 | Dahl | 395/800 |
| 5,278,834 | 1/1994 | Mazzola | 370/469 |
| 5,307,345 | 4/1994 | Lozowick | 370/61 |
| 5,400,326 | 3/1995 | Smith | 370/61 |
| 5,406,425 | 4/1995 | Johnston et al. | 360/48 |
| 5,438,509 | 8/1995 | Heffron | 395/670 |
| 5,438,575 | 8/1995 | Bertrand | 371/48 |
| 5,493,652 | 2/1996 | Koufopavlou et al. | 711/170 |

FOREIGN PATENT DOCUMENTS 0 393 898  10/1990  European Pat. Off. .
WO 95/04970  2/1995  WIPO .

*Primary Examiner*—John W. Cabeca
*Assistant Examiner*—Mehdi Namazi
*Attorney, Agent, or Firm*—Sughrue, Mion, Zinn, Macpeak & Seas, PLLC

[57] ABSTRACT

A bridge device (4) for connecting a plurality of communication networks (1–3) around which data is transmitted in frames which include control information defining at least the identity of a destination for data in the frame, each network having at least one end station (8–12). The bridge device comprises a corresponding plurality of data coupling units (13,14) for connection to respective ones of the networks (1–3), each data coupling unit including receive (13) and transmit (14) interfaces for respectively receiving data from and transmitting data onto the connected network. A common store (17) is connected to all the data coupling units for receiving data being transmitted from one network to another. A controller (16,28) controls the routing of data through the bridge device (4) via the common store (17), the controller causing incoming data to be routed to a destination network before the data has been fully stored in the common store, if predetermined conditions are satisfied, the controller being adapted to monitor the amount of free space in the common storage means and to prevent the supply of data to the common store if the available free space is less than a predetermined amount.

4 Claims, 2 Drawing Sheets

BRIDGE DEVICE

The present application claims the benefit of Provisional application Ser. No. 60/007,541, filed Nov. 24, 1995.

FIELD OF THE INVENTION

The invention relates to a bridge device for connecting a plurality of self-contained communication networks around which data is transmitted in frames which include control information defining at least the identity of the destination for data in the frame, each network having at least one end station.

DESCRIPTION OF THE PRIOR ART

Examples of networks to which the invention apply include token passing rings as well as FDDI and ATM networks.

In typical local area network installations, it has been possible in the past to use a single network to achieve communication between a number of end stations such as PCs, file servers and the like. However, with the need to provide more and more end stations, it has been the practice to divide the overall system up into a number of individual local area networks (for example one per floor) and to connect the networks together via bridge and other devices. Most of the time, an end station on a network will only wish to transmit to another end station on the same network. However, there will be occasions when communication between end stations on different networks will be required. For example, an end station on a network may require access to a file server on another network. To achieve this, the end station constructs a data frame including control information which is addressed to the final destination on the other network. This frame is then sent around the first network until it reaches the bridge which recognises that the frame is destined for an end station on another network and so diverts the frame into its memory. A controller within the bridge device reviews the frame once it is received in the memory to determine on which output port it should be directed (since typically a bridge device will be connected to more than two networks), and in some cases will make changes in the control information, following which the frame is sent out onto the desired output port for onward transmission. The destination end station may be on the output network or the frame may have to traverse one or more further bridge devices.

The routing of a frame through a bridge device is generally carried out using one of two techniques. In Source Routing, prior to transmitting a frame, an end station transmits a special Source Route Broadcast frame (to which data could also be attached) which is transmitted to all end stations on all networks and, as it passes through each bridge device, is modified to indicate the network on to which it is being transmitted. The source route broadcast frame includes the desired destination end station identifier and once that end station receives the broadcast frame it indicates its presence and the frame is returned to the originating end station. The originating end station can determine from the information now contained on the returned frame the identities of the various networks through which the frame has passed and this information is incorporated into the data frame which is to be sent so as to control the routing of the data frame.

In Transparent Bridging, each bridge device contains a look-up table which is continuously updated with information defining for each end station on all the networks the output port of the bridge concerned to which a frame directed to that end station should be coupled. This information is built up by the bridge by monitoring source addresses on incoming frames.

Recently, it has been proposed to incorporate a common memory or storage means through which all data is transmitted. Examples include WO-A-9504970, U.S. Pat. No. 5,307,345, and U.S. Pat. No. 5,400,326.

This enables certain types of data to be transmitted through the bridge much more quickly than has previously been possible. This is achieved by providing common storage means through which all the data passes irrespective of the incoming and destination networks concerned and control means which can route incoming data to a destination network without waiting for all the data to be stored in the common storage means. Furthermore, by routing data to the destination network before the data frame has been fully stored in the common storage means, the amount of time the bridge device takes to transfer data from one network to another can be considerably reduced. This technique is known as "cut-through".

Problems can arise, however, with the use of a common memory in handling large volumes of data.

SUMMARY OF THE INVENTION

In accordance with a first aspect of the present invention, a bridge device for connecting a plurality of communication networks around which data is transmitted in frames which include control information defining at least the identity of a destination for data in the frame, each network having at least one end station, comprises a corresponding plurality of data coupling means for connection to respective ones of the networks, each data coupling means including receive and transmit interfaces for respectively receiving data from and transmitting data onto the connected network; common storage means connected to all the data coupling means for receiving data being transmitted from one network to another; and control means for controlling the routing of data through the bridge device via the common storage means, the control means causing incoming data to be routed to a destination network before the data has been fully stored in the common storage means, if predetermined conditions are satisfied, the control means being adapted to monitor the amount of free space in the common storage means and to prevent the supply of data to the common storage means if the available free space is less than a predetermined amount.

We have devised a significant improvement upon the known bridge device by causing the control means to monitor the amount of free space in the common storage means and thus avoid breakdown of the device and/or the connected networks when too much data is stored in the common storage means.

The control means could be implemented in a variety of ways but in the preferred example includes a free buffer pointer queue store which contains a set of pointers indicating addresses in the common storage means which are available for storing incoming data. Typically, this queue store will constitute a FIFO which is replenished with pointers relating to the addresses of frames which have been transmitted out of the bridge device from the common storage means. This provides a particularly simple way of utilising the common storage means.

When the control means is implemented in this manner, the content of the common storage means can be determined by monitoring the free buffer pointer queue store.

The predetermined conditions may include, for example, ensuring that the input and output networks operate at compatible speeds so that the leading end of a data frame can be output on a destination network while the trailing end is still being input to the common storage means. Typically, this will require the output network to operate at least the same speed or a slower speed than the input network.

Another predetermined condition is to ensure that the data coupling means associated with the desired output network is enabled.

There may also be circumstances in which the device does not permit cut-through. This would be, for example, where there is a need to check the integrity of the frame before it is transmitted or where some processing needs to be carried out on the data in the frame before it is transmitted.

Although each data coupling means could be connected individually to the common storage means, preferably the device further comprises a receive bus connected to the receive interfaces of all the data coupling means, the receive bus being connected to an input of the common storage means; and a transmit bus connected to the transmit interfaces of the data coupling means and to an output of the common storage means. In this way, the control means and common storage means of the bridge device are separated from the data coupling means by receive and transmit data buses which enable the device to be used in an optimum manner.

For example, each receive interface preferably determines from the control information of an incoming frame whether it needs to be processed by the bridge device in which case the frame is supplied to the receive data bus but otherwise is supplied directly to the corresponding transmit interface of the same data coupling means for onward transmission around the network. In this way, the components of the bridge device are only fully utilised when a data frame is destined for the bridge device.

A problem can arise when using a bridge device utilising a common storage means, such as according to the first aspect of the invention, when an aborted or otherwise damaged frame is transmitted through the device. Such a frame can be generated for example when the station on a data network sending the frame may abort transmission of the frame sometime after transmission has commenced. In the case where this frame is being forwarded across a bridge device using cut-through technology, the transmission of this frame from the output port may have already commenced before it is detected that the frame has been aborted or otherwise severely damaged. In this case it is desired that the transmission of the frame from the output port be terminated in such a way as will minimise the disruption to the output ring.

In a typical network protocol, serious disruption can occur if an aborted frame is detected on the network requiring a significant time for the network to reestablish normal operation. For this reason, it is desirable that if an aborted frame is received on one port, it should not be transmitted as an aborted frame on any port(s) to which the frame is being forwarded.

In order to overcome this problem, the data coupling means responds to the passage of an aborted or damaged frame by causing the frame to be output onto the destination network with incorrect check data.

Most network protocols include, as part of the frame format, check data in the form of a checksum or cyclic-redundancy-check (CRC), which is used by the receiving station to ensure that no data corruption has occurred during the transmission of the frame. Frames with invalid checksums or CRCs cause comparatively little disruption on typical networks.

In this proposal a frame received into one port as an aborted or (severely) damaged frame is converted into a frame with an intentionally wrong checksum or CRC on the output port by detecting the abort condition on the input port, and ensuring that the frame is sent out from the output ports with a bad checksum or CRC.

This can be done in either of two ways: firstly, the frame being transmitted may be monitored, and terminated with no further intervention should the last bytes in the frame correspond to an incorrect checksum or CRC for the part-frame already transmitted. In this case, should the last bytes in the frame correspond to a correct checksum or CRC for the part-frame already transmitted, the transmission of the frame must be aborted. This scheme is the simpler to implement, and has the effect of reducing the number of aborted frames forwarded as aborted frames by a factor of the number of possible different CRC/checksum values.

The second, more general technique is to append an intentionally incorrect checksum or CRC onto the end of the frame, and then transmit a normal end-of-frame sequence. This effectively converts an aborted or severely damaged frame received at the input port into a frame with an incorrect checksum/CRC on the output port(s), significantly reducing the amount of disruption on the output network(s).

As mentioned above, the networks to which the bridge device can be connected could take a variety of forms including token passing rings, FDDI and ATM.

When common storage means is used in a bridge device, it is important to be able to utilise such common storage means in a flexible manner so as to optimise its size. In theory, it would be preferred if a single address could be used to point to each received data frame. Typically, on start up the networks set a maximum size of a data frame and this could be used to set a buffer size within the common storage means, each buffer being defined by a continuous sequence of addresses. The base address of each buffer can then be used to point to the buffer. However, in practice, many data frames are considerably smaller than the maximum possible size and this leads to a significant wastage of storage space. In practice, therefore, a frame is stored in a variety of locations within a store (usually in a set of discontinuous storage locations) and a separate index (known as a linked list) must be kept containing pointers to each location in the store holding data corresponding to different portions of each frame. The problem with this approach is that it leads to the need for a large index store.

In accordance with a second aspect of the present invention, a data storage system for storing data frames supplied from or to be supplied to a data communication network comprises a memory defining a number of buffers, each buffer having a number of data storage locations at a corresponding number of addresses arranged in sequence; control means for loading data in to locations in the memory; and a pointer store for storing memory address pointers indicating addresses of the memory at which data can be stored, wherein each pointer includes a buffer address indicating the start address of a respective one of the memory buffers, and an offset value indicating the address of the first of a sequence of locations within the buffer in which a data frame can be stored, the control means selecting a buffer pointer from the pointer store to indicate a region of memory in which an incoming data frame can be stored, updating the offset value of the pointer to indicate a sequence of locations remaining unused in the buffer if the sequence of locations thereby indicated is sufficient for storing another data frame having a predetermined maximum size, and returning the buffer pointer to the pointer store.

With this aspect of the invention, storage space is utilised much more effectively and a single buffer can be used to store more than one data frame but with all portions of the data frame being stored in a continuous sequence of locations.

In general, each start address will define a buffer with a size substantially equal to the maximum permissable size of a data frame.

Typically, the maximum size of a data frame will be 18K bytes and a buffer may have a size of 32K bytes. The buffer may be divided into smaller 1K byte portions whose addresses define potential offset values. Typically, the buffer comprises a RAM.

Preferably, the control means is adapted to prevent the corresponding buffer pointer from being returned to the pointer store until all data frames in the buffer have been transmitted.

This second aspect of the invention is particularly suitable for implementing the common storage means of the first aspect of the invention.

A function which bridge devices are often required to undertake is to handle source route broadcast frames. In source routing, when an end station wishes to transmit data to an end station on another network, it needs initially to determine the route that the data frame must follow. To achieve this, the source end station generates a source route broadcast frame. This frame is sent out to all end stations which are coupled to the source network via bridges. When a bridge device receives a source route broadcast frame, it retransmits that frame onto all networks to which it is connected. At the same time, it modifies the frame broadcast on each network to indicate the identity of the network (ring out number) and the bridge device number or identity. The broadcast frame contains the final, desired destination address and once a frame is received at the appropriate destination end station, this end station generates a return frame, which is substantially a copy of the broadcast frame but indicating that it has been received by the desired end station (and often including other information), which is returned to the source end station. The source end station then incorporates the list of network identities contained within the returned frame into the data frame to define the route for the data frame.

One of the problems with source routing is the time and complexity required of bridge devices to transmit such broadcast frames to all networks with each frame being differently modified to indicate the identity of the network onto which it is transmitted.

In accordance with a third aspect of the present invention, a bridge device for connecting a plurality of self-contained communication networks around which data is transmitted in frames which include control information defining at least the identity of a destination for data in the frame, each network having at least one end station, comprises a corresponding plurality of data coupling means for connection to respective networks, each data coupling means including receive and transmit interfaces for respectively receiving data from and transmitting data onto the connected network; common storage means connected to all the data coupling means for receiving data being transmitted from one network to another; and control means for controlling the routing of data through the bridge device via the common storage means, wherein the control means responds to the arrival of a source route broadcast frame from one network by:

i) causing the frame to be stored in the common storage means; and, ii) instructing each data coupling means to transmit the source route broadcast frame onto its network, by supplying the address of the stored frame to the data coupling means, and wherein each data coupling means is responsive to said instruction to modify the frame, prior to transmission, by adding at least the identity of a network onto which the frame is to be transmitted.

In this aspect of the invention, the arriving source route broadcast frame is stored once in the common storage means and the address of that frame is supplied to each data coupling means. The data coupling means then simply has to access the common storage means when it is ready to transmit the frame and as it handles the frame (either on the fly or by temporarily storing it), it modifies part of the frame to incorporate at least the identity of the network onto which the frame is being transmitted. In addition, the frame may be modified with the bridge device identity (or number).

The control means could generate instructions to the data coupling means in a variety of ways including, for example, sending a separate control instruction to each data coupling means. Preferably, however, the control means is adapted to place the instruction in a header prepended to the frame in the common storage means, the data coupling means being adapted to remove the prepended header prior to transmission and to respond to the instruction in the prepended header. This provides a very convenient way of instructing each data coupling means by utilising a single instruction which is stored in the common storage means.

The control means releases the address of the frame in the common storage means for reuse only after the extraction of data from that address has been completed.

There are certain special cases in which bridge devices are utilised and where data frames, although apparently being addressed to the bridge device, do not, in fact, need to be fully received by the bridge device. Examples include frames which are transmitted onto a network for statistical purposes and network control protocol messages.

Conveniently, and in accordance with a fourth aspect of the present invention, a bridge device for connecting a plurality of self-contained communication networks around which data is transmitted in frames which include control information defining at least the identity of the destination for data in the frame, each network having at least one end station, comprises a corresponding plurality of data coupling means for connection to respective networks, each data coupling means including receive and transmit interfaces for respectively receiving data from and transmitting data onto the connected network; and control means for controlling the transfer of data through and by the device, wherein the control means is adapted to add control information to a frame to be transmitted by a data coupling means if the frame, when received back by the data coupling means, is not to be returned into the bridge device, the data coupling means being adapted to remove the control information prior to transmission onto the attached network and to store the information so that on receiving the returned frame it is not forwarded into the bridge device.

Typically, the control information is contained in a prepended header to the data frame.

It will be understood that bridge devices according to the first, second, third and fourth aspects of the invention can be used in any combination.

BRIEF DESCRIPTION OF THE DRAWINGS

An example of a communication network incorporating bridge devices according to the invention will now be described with reference to the accompanying drawings, in which.

DETAILED DESCRIPTION OF THE EMBODIMENTS

Figure 1:
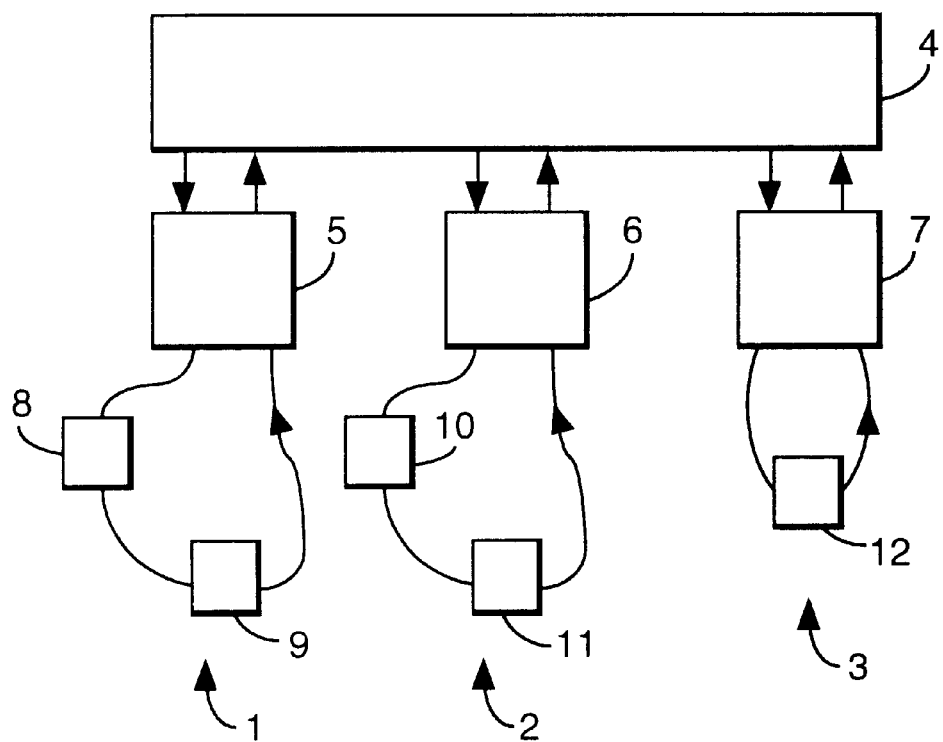
FIG. 1 is a block diagram of the network.

The communications network shown in FIG. 1 comprises three token ring local area networks 1,2,3 each connected to a bridge 4 via respective coupling devices 5,6,7. The local area network 1 has a pair of end stations 8,9, the local area network 2 has a pair of end stations 10,11 and the local area network 3 has a single end station 12. In practice, each local area network is likely to have a much larger number of end stations such as PCs, file servers and the like but for clarity only a small number is shown in the drawing. Each of the local area networks 1,2,3 is self-contained in the sense that data in the form of frames can be transmitted around the network through the coupling devices 5–7 in a conventional manner without passing through the bridge 4. However, occasionally it will be necessary for an end station on one network to communicate with an end station on another network. For example, the end station 8 may wish to communicate with the end station 12. In that case, communication takes place through the coupling device 5, the bridge 4 and the coupling device 7.

Figure 2:
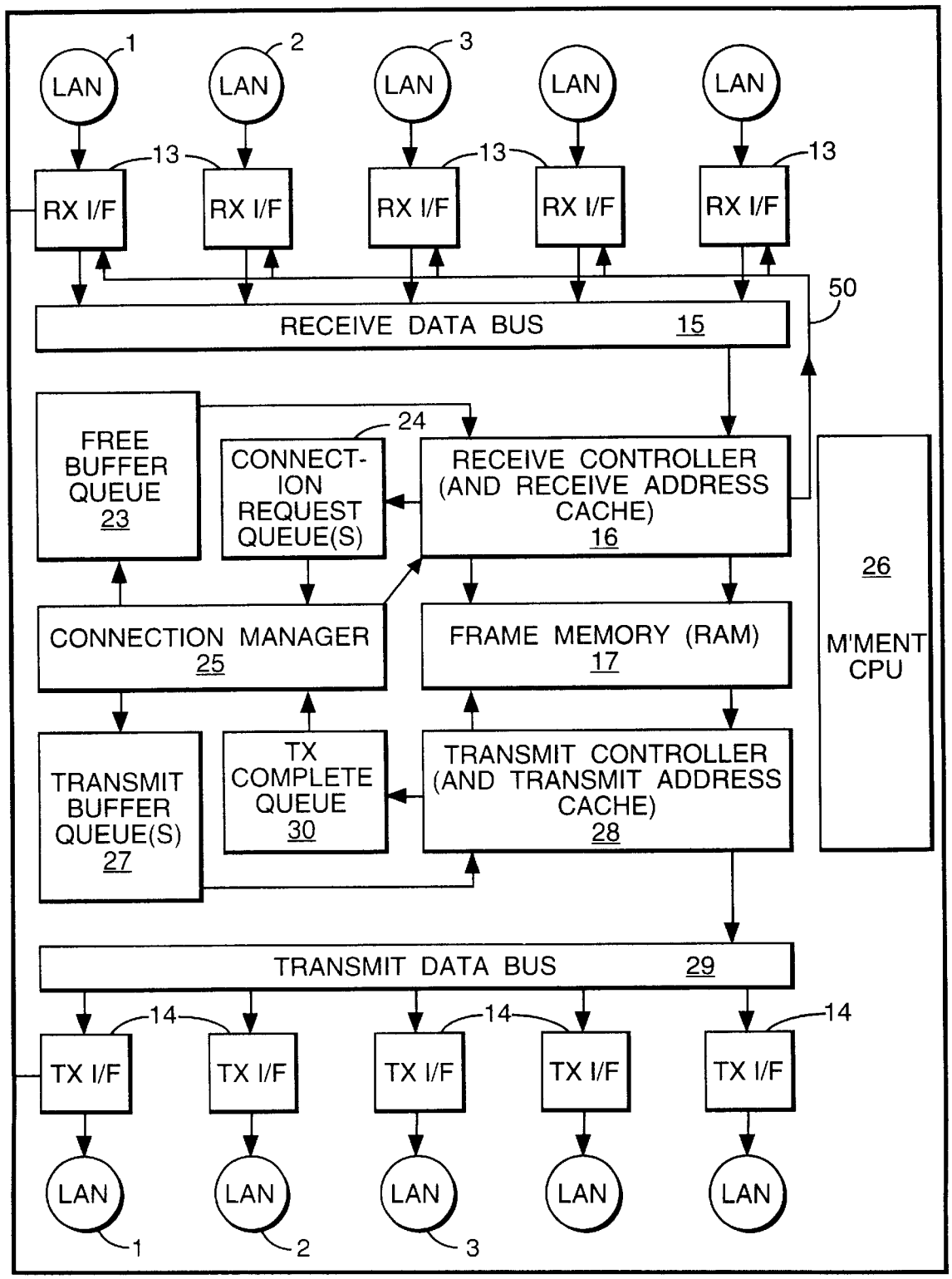
FIG. 2 is a block diagram of an example of one of the bridges shown in FIG. 1; and, FIG. 3 illustrates part of the frame memory shown in FIG. 2.

The construction of the bridge 4 is shown in more detail in FIG. 2. Each coupling device 5,6,7 comprises a receive interface 13 and a transmit interface 14. For convenience, these have been shown separated out in FIG. 2 although in practice each pair of interfaces 13,14 will be situated together in the units 5,6,7 etc. (Although only three coupling devices are shown in FIG. 1, FIG. 2 illustrates 5 coupling devices).

The incoming arm of each network is connected to the receive interface 13 of the respective coupling device. The receive interface 13 performs analogue to digital conversion where appropriate and carries out an initial monitoring process of an incoming token or frame. The receive interface includes a repeater function so that if the incoming information consists of a token then this is repeated back for onward transmission around the ring.

If the incoming information is a data frame, the receive interface looks at the initial control information in the frame (and in particular the destination address) to see whether the frame needs to be passed into the bridge 4 or can be passed on around the ring. In a conventional token ring protocol such as that defined by the IEEE 802.5 standard, a data frame includes as control information at least a destination address and a source address. Thus, if the end station 9 wishes to transmit data to the end station 8 then the data frame will be formed with a source address equal to "9" and a destination address equal to "8". When the receive interface notes that the destination address is "8" it will simply pass the data frame on to the transmit interface 14. If, however, the end station 9 wishes to transmit to the end station 12 then the receive interface will note that the frame must be passed through the bridge device 4.

In some cases, if the receive interface 13 is configured as a transparent bridge port then even frames on which no match occurs will be propagated to the bridge device with prepended control information to indicate the reason for this.

It should be noted that the receive and transmit interfaces 13,14 could be configured for full duplex operation as is envisaged for future token ring protocols.

Having decided to propagate an incoming frame into the bridge device, the receive interface 13 extracts control information from the frame and also prepends a header to the frame. This prepended header contains control information for the transmit interface of whichever coupling device it is eventually sent to. The appropriate transmit interface 14 will then remove the header before the frame is transmitted. The control information extracted by the receive interface 13 will include the reason for receiving the frame (the match reason), and the Ringout identity that was matched if the incoming frame is a source route unicast frame (i.e. a frame containing data which is being transmitted using the source routing technique). The match reason may for example be that the incoming frame is a source route unicast frame, a source route broadcast frame, a broadcast frame, or a frame addressed to a CPU within the bridge. The Ringout identity is the identity of the local area network (such as the network "3" in this example) to which the frame is to be coupled by the bridge device 4. The control information will also include the incoming port index of the bridge (although this will not be extracted from the frame).

Once the control information has been assembled, it, together with the frame, is propagated by the receive interface 13 via a receive data bus 15 to a receive controller 16. This occurs as soon as the control information has been obtained and does not require the receive interface 13 to store the frame until its reception has been completed. Following the completed reception of a frame by the receive interface 13, additional (end) control information associated with the completed frame (the frame length and the received CRC status) is propagated also to the receive controller 16 via the receive data bus 15.

The receive data bus 15 is a 16 byte fixed slot TDM bus on which each receive interface is allocated a slot. Each slot is divided into two parts, one part for the control information, and the second part for the data.

Figure 3:
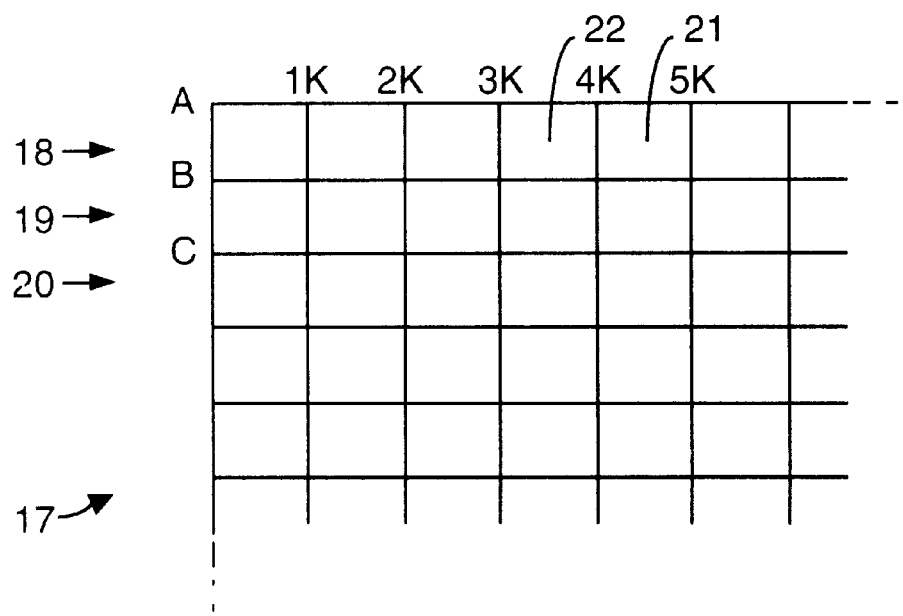

The receive controller 16 is suitably constructed logic which causes incoming frames received from the receive data bus 15 (including the control information) to be stored in a frame memory 17. The frame memory 17 is a RAM forming a common store. FIG. 3 illustrates a portion of the frame memory 17 in more detail. The memory 17 is logically divided into a number of buffers 18,19,20 etc., each buffer having a length (i.e. number of storage locations) at least equal to the maximum expected size of data frame (plus control information). The maximum size which is typically set for data frames is 18 Kbytes so that each buffer 18,19,20 . . . should have a size a little larger than 18 Kbytes in order to accommodate a maximum size data frame and the control information. In a typical example, each buffer may be 32 Kbytes.

Each buffer is identified by a buffer pointer which is made up of two portions. The first portion defines a base address for the buffer and the second portion an offset value. For example, the base addresses for the buffers 18,19,20 are indicated at A,B,C, respectively in FIG. 3. These base addresses define the start address of each buffer. The offset value indicates the location within one of the buffers at which further data may be stored. Conventionally, and as shown in FIG. 3, each buffer is notionally divided into 1 Kbyte blocks. Thus, a pointer to a portion of the buffer commencing at a block 21 will have the form:

A 4K

The reason for this approach is to optimise the use of the frame memory 17. Thus, although each buffer needs to be able to store a maximum size data frame, in practice data frames are usually much smaller than the maximum size.

Further, although it is convenient to be able to refer to a continuous sequence of locations when obtaining and storing data frames, this would lead to large wastage of space if it was only possible to access the frame memory using the base addresses of the buffers (i.e. storing one data frame per buffer).

With this aspect of the invention, it is possible to maximise use of the buffers by enabling more than one data frame to be stored in a single buffer. For example, if an incoming data frame has a length of 2 Kbytes then, with the appended control information, it can be stored within the first 3 Kbytes of the buffer 18. Thus the buffer pointer for this first data frame will have the form:

A 0K

Assuming that the buffer 18 has a total length of 32 Kbytes, there is still room to store a maximum size data frame (plus control information) and so a new buffer pointer is defined of the form:

A 3K (which indicates that the next frame can be stored in the buffer 18 starting at the block 22).

A free buffer queue store 23 in the form of a FIFO is connected to the receive controller 16 and contains a set of free buffer pointers which can be extracted by the receive controller 16 as necessary. Thus, for each slot on the receive bus 15, the receive controller 16 holds a buffer pointer, which it has obtained from the free buffer queue store 23, and as data is received across the receive data bus 15 it is placed in the appropriate buffer at the address defined by the pointer.

The control information which is generated at the receive interface 13 for each frame is also stored in a connection request queue store 24 by the receive controller 16. This control information can be sent to the connection manager 25 via the receive controller 16 as shown or in parallel with the data via a separate path (not shown). As explained above two sets of control information are generated: at the start and at the end of the receive data frame. When the start control information is received by the receive controller 16 it is placed into the connection request queue store 24 along with the buffer pointer which has been used to control storage of the data frame in the frame memory 17. If the match reason received from the receive interface indicates a transparent frame then the receive controller 16 also extracts the frame's source and destination addresses from the received data and places them in the connection request queue store 24.

When the end control information is received it is also placed into the connection request queue store 24 along with the receiving port index which allows a connection manager 25 to which the store 24 is connected to correlate the length to a particular frame stored in the memory 17.

To allow the connection manager 25 to distinguish between an entry in the store 24 of the control information and the beginning of a frame or the end of a frame, the receive controller 16 places additional identification information into each entry.

It should be noted that the receive controller 16 also places the received control information into the appropriate buffer in the frame memory 17 (as described above) for use by a management CPU 26 if the frame is in fact destined to the management CPU.

As an improvement for System performance the receive controller 16 looks at the match reason when the start control information is received and if bits other than the TB (transparent bridge) or SR (source route) unicast are set it assumes that these frames are not going to be cut-through and therefore delays placing the received control information into the connection request queue store 24 until the end control information has been received. At this point only one merged entry of the beginning and end control information is written in, this entry containing all the data required for the connection manager 25 to deal with the buffer, i.e. match reason, source port, length/CRC status, buffer pointer. In this situation, the single entry is treated as end of frame control information.

The connection manager 25 is provided to control the forwarding of received frames and the maintenance of a transparent bridging data base (if provided). It does this by using the information in the connection request queue store 24 to determine which transmission queue, if any, a buffer pointer indicating a received data frame should be placed into.

In the case of a transparent bridging data base, the connection manager 25 updates the data base by using the source addresses obtained from received frames. Thus, this database maintains a concordance between a source address and the port of the bridge at which the frame was received.

A further function of the connection manager 25 is to check the management CPU 26 to see if it has any frames it wishes to transmit.

As soon as possible after control information has been entered into the connection request queue store 24, the connection manager 25 reviews that control information. Firstly, it determines whether the control information is from the beginning or the end of a frame.

If the control information is from the beginning of a frame, the connection manager 25 first checks the match reason. If the match reason indicates that the frame is not to be transmitted through the bridge then this means that the frame is destined for processing by the management CPU 26 in which case the connection manager 25 must wait for receipt of the end of the frame in the frame memory 17 before queuing the appropriate buffer pointer in a management buffer pointer queue (not shown) for transmission to the management CPU 26.

If the frame is a source route unicast frame then the connection manager 25 translates the ringout identity to a destination port index to which the frame should be directed, while if the frame is a transparent bridge frame then the connection manager 25 translates the receive destination address to a destination port index using the transparent bridge database.

Assuming the match reason indicates, for the above or other reasons, that the frame is to be transmitted though the bridge, the connection manager 25 then accesses a look-up table (not shown) to determine whether a frame can be queued between the source port and the destination port which has been identified. This look-up table typically comprises a two-dimensional table with a simple binary indication for each combination of source and destination ports to indicate whether or not frames can be queued immediately. Immediate queuing (before full receipt of a frame but after full receipt of the start of frame control information) will in general be permitted providing the destination port is active and can operate at a speed which is equal to or lower than the transmission speed of the source port. However, cut-through may not be permitted in other situations e.g. if the destination port is not active or the CRC must be checked before transmission. If this frame can be queued immediately (i.e. cut-through is permitted) then the buffer pointer indicating the location of the start of the frame in the frame memory 17 is placed into a transmit buffer queue store 27 associated with the appropriate destination port. Only a single transmit buffer queue store 27 has been shown in FIG. 2 although in practice there will be at least two queues for each destination port, LLC and MAC with the MAC having priority over the LLC.

If the frame is a transparent bridge frame then in addition the connection manager 25 will update the transparent bridge data base using the source address extracted from the frame.

If the control information obtained from the connection request queue store 24 is from the end of a frame then the connection manager 25 first checks to see if the buffer pointer last received from the source port (i.e. at the beginning of the frame) has already been queued. If it has then there is nothing more to do.

If the buffer pointer has not been queued (i.e. the cut-through operation has not been carried out) then the connection manager 25 will check the CRC status and if it is unacceptable, the buffer pointer is placed back into the free buffer queue store 23 and nothing more is done.

If the CRC status is acceptable, the connection manager 25 then checks to see if the frame is a non-bridged frame, as explained above, and if so the appropriate buffer pointer is placed into the appropriate management CPU queue store.

Otherwise, the frame must be a frame for transmission through the bridge and so the connection manager 25 translates the Ringout information (in the case of a source route unicast frame) or the destination address (in the case of transparent bridging) as appropriate into the destination port index.

If the frame could not be queued on the first pass then the destination and source port indexes are stored together with the buffer pointer. Therefore when the end of the frame is received and it is detected that the buffer has not already been queued the destination and source port indexes are retrieved and the queuing process restarts from that point, although if the buffer cannot be queued this time the buffer is returned to the free FIFO.

The connection manager 25 then checks the reason why cut-through was not permitted by referring to the source and destination port indexes. If forwarding between the particular source and destination ports is not allowed then the buffer pointer will be placed back in the free buffer queue store 23. Alternatively, if cut-through was not permitted for example due to incompatible transmission speeds of the two networks or the need to check the CRC status then the frame can now be queued at the appropriate destination port and the buffer pointer is placed into the appropriate transmit buffer queue 27.

Transmission of data frames is handled by a transmit controller 28. The transmit controller 28 is responsible for removing a buffer pointer from the transmit buffer queue 27 associated with a particular transmit interface 14, fetching the data from the buffer in the frame memory 17 associated with the buffer pointer, and propagating the data via a transmit data bus 29 to the appropriate transmit interface 14. The transmit controller 28 can simultaneously perform this task for all the attached transmit interfaces 14.

The transmit data bus 29 is a TDM bus with one slot for each transmit interface 14.

When the end of the data has been extracted from a buffer in the frame memory 17, the transmit controller 28 places the buffer pointer into a transmit complete queue store 30 and then checks the appropriate transmit buffer queue 27 for another buffer pointer.

The connection manager 25 is responsible for removing buffer pointers from the store 30 and returning them to the free buffer queue store 23. However, before placing a buffer pointer into the store 23 a check is made to see if the pointer should instead be returned to the management CPU 26. When the buffers 18,19 etc in the frame memory 17 have been used to store more than one frame, a buffer pointer will only be placed back in the free buffer queue 23 after all data frames in that buffer have been transmitted or otherwise disposed of.

Each transmit interface 14 is responsible for accepting data from the transmit data bus 29 and transmitting it to the attached LAN. Data is received across the transmit data bus 29 and placed into a small amount of local buffering in the interface 14 (not shown). When the start of the data is received, the header that was prepended to the frame at the receive interface 13 is removed and parsed. This header is used to control the operation of the transmit interface 14 for each individual frame. The transmit interface then attempts to transmit the frame onto the attached LAN. Because of the potential latency accessing the LAN, a flow control mechanism back to the transmit controller is provided to prevent the local buffering overflowing.

In addition to the control information that is prepended to the data frame there is additional tag information that is sent in parallel to the data frame. This tag information is stored with the data frame in the frame memory 17 and is used by the transmit interface 14 to identify the end of the data frame in memory.

We have described above how the bridge device handles the transmission of a source route unicast frame. This frame contains a list of network identities defining the networks through which the frame must be transmitted to reach the desired end station. In order to obtain the list of network identities, the source end station initially transmits a source route broadcast frame. This frame contains special control information indicating that it is to be sent to all end stations within the communications system. Thus, when such a broadcast frame is received by the bridge 4, it will cause the frame to be retransmitted from all available transmit interfaces 14. However, on retransmission, it is necessary to append the Ringout data corresponding to that interface. This will be different for each interface since it identifies a different LAN. In order to minimise processing time, when a match reason indicates a source route broadcast frame, the connection manager 25 passes control to the management CPU 26 which instructs the connection manager 25 to cause the buffer pointer indicating the received source route broadcast frame to be queued in each store 27.

In addition, the control information prepended to the frame stored in the frame memory 17 contains a bit which is set to indicate a "source route broadcast frame". When the frame and control information are passed to each transmit interface 14, the interface 14 monitors for this bit and if it finds that the bit has been set, the transmit interface modifies the frame prior to transmission to incorporate the ringout identity of the associated LAN.

There are certain situations in which a frame is transmitted from the bridge onto a network and which, when received back by the receive interface, would normally generate a match reason indicating that the frame should be transmitted back into the bridge device but in fact do not need to be sent back into the bridge device. An example are frames generated for statistical purposes by the management CPU 26. In order to prevent this, the management CPU 26 sets an appropriate bit in the header which is prepended to the frame in the frame memory 17 prior to its transfer to the appropriate transmission interface 14. When the transmission interface 14 receives the prepended header and notes that the appropriate bit has been set, it transfers that information to the associated receive interface 13 so that when the frame is received back by the receive interface 13, the interface 13 does not transmit the frame to the receive data bus 15.

Another example arises from the nature of SR/Token Ring and the topologies that it is deployed in which requires that some frames are received back by the same interface that transmits them if certain match criteria are met. However if the bridge device were to receive back all the frames that met the match criteria the switch would be wasting large amounts of system bandwidth because most of these frames would just be discarded. The "receive in strip" bit in the prepended header indicates which frames should be received back if match criteria are met, on a frame by frame basis. It turns out that the frames that are required to be potentially received back are frames that have been forwarded/sourced by a management CPU and so the CPU can set the RX in strip bit specifically for these frames.

In some cases, it may be necessary to control the supply of frames to the frame memory in dependence upon how full the frame memory is. In one refinement, therefore, the connection manager 25 monitors the free buffer queue 23 and depending upon how empty the free buffer queue 23 is, the connection manager 25 will issue a control level to the receive controller 16 which is, in turn, transferred to each of the receiver interfaces 13 via a line 50. In the preferred arrangement, four control levels are envisaged:

NORMAL—If the free buffer queue is relatively full, all incoming frames matched by the receive interfaces 13 may be sent and stored in the frame memory 17.

NO UNICAST—Under this condition, the receive interfaces 13 will not send any frames to the frame memory which are matched as source route unicast. This also applies to transparent bridge transfers.

MAC ONLY—Under this condition, only express MAC frames are passed to the frame memory 17.

NONE—No frames are passed to the frame memory 17.

The description so far is based on the assumption that a single buffer is associated with each transmit interface. A problem can arise, however, where data to be transmitted is prioritised. In that situation, preferably, a number of queues are allocated to each transmit interface so that data at different priorities can be stored in different queues and then transmitted in accordance with the priority levels.

We claim:

1. A data storage system for storing data frames supplied from or to be supplied to a data communication network, the system comprising a memory defining a number of buffers, each said buffer having a number of data storage locations at a corresponding number of addresses arranged in sequence; control means for loading data in to locations in said memory; and a pointer store for storing memory address pointers indicating addresses of said memory at which data can be stored, wherein each pointer includes a buffer address indicating the start address of a respective one of the memory buffers, and an offset value indicating the address of the first of a sequence of locations within said buffer in which a data frame can be stored, said control means selecting a buffer pointer from said pointer store to indicate a region of memory in which an incoming data frame can be stored, updating the offset value of the pointer to indicate a sequence of locations remaining unused in said buffer if the sequence of locations thereby indicated is sufficient for storing another data frame having a predetermined maximum size, and returning the buffer pointer to said pointer store.

2. A system according to claim 1, wherein each said start address defines a buffer with a size greater than the maximum permissible size of a data frame.

3. A device according to claim 2, wherein each said buffer has a size of 32 Kbytes.

4. A system according to claim 1, wherein said control means is adapted to prevent the corresponding buffer pointer from being returned to said pointer store until all data frames in said buffer have been transmitted.

* * * * *